United States Patent
Yanagase et al.

(10) Patent No.: US 6,511,750 B1
(45) Date of Patent: Jan. 28, 2003

(54) ARTIFICIAL MARBLE, CURED RESIN CONTAINING MICA FLAKE AND/OR GLASS FLAKES, AND POLYMERIZABLE COMPOSITION CONTAINING MICA FLAKES AND/OR GLASS FLAKES

(75) Inventors: Akira Yanagase, Hiroshima (JP); Hiroyuki Watanabe, Hiroshima (JP); Shougo Okazaki, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/509,811
(22) PCT Filed: Oct. 6, 1998
(86) PCT No.: PCT/JP98/04510

§ 371 (c)(1),
(2), (4) Date: Apr. 6, 2000

(87) PCT Pub. No.: WO99/18046
PCT Pub. Date: Apr. 15, 1999

(30) Foreign Application Priority Data

| Oct. 7, 1997 | (JP) | 9-274801 |
| Oct. 7, 1997 | (JP) | 9-274802 |
| Oct. 7, 1997 | (JP) | 9-274803 |
| Mar. 10, 1998 | (JP) | 10-058543 |
| Mar. 10, 1998 | (JP) | 10-058544 |
| Mar. 10, 1998 | (JP) | 10-058545 |

(51) Int. Cl.$^7$ .............................................. B32B 19/02
(52) U.S. Cl. ................... 428/406; 428/407; 428/402; 428/363; 428/15; 523/171
(58) Field of Search .................... 428/15, 17, 363, 428/402, 403, 404, 406, 407; 523/171

(56) References Cited

U.S. PATENT DOCUMENTS

| 6,011,116 A | * | 1/2000 | Aoyama et al. |
| 6,028,127 A | * | 2/2000 | Yanagase et al. |
| 6,083,609 A | * | 7/2000 | Susaki et al. |
| 6,316,548 B1 | * | 11/2001 | Koyanagi et al. |

\* cited by examiner

*Primary Examiner*—Deborah Jones
*Assistant Examiner*—Wendy Boss
(74) *Attorney, Agent, or Firm*—Oblon, Spivak, McClelland, Maier & Neustadt, P.C.

(57) ABSTRACT

An artificial marble having appearance remarkably resembling that of a natural stone in which particles (X) containing a vinyl polymer (A) and mica flake (B) and/or a glass flake (C) are dispersed in a matrix (Y) containing a vinyl polymer (E); a mica flake- and/or glass flake-containing cured resin article which is useful as this particle (X); and a mica flake- and/or glass flake-containing polymerizable composition useful for production of the cured resin article.

8 Claims, No Drawings

ARTIFICIAL MARBLE, CURED RESIN CONTAINING MICA FLAKE AND/OR GLASS FLAKES, AND POLYMERIZABLE COMPOSITION CONTAINING MICA FLAKES AND/OR GLASS FLAKES

TECHNICAL FIELD

The present invention relates to a polymerizable composition useful in producing a pattern material for artificial marble which contains a mica flake and/or glass flake. Further, the present invention relates to a mica flake- and/or glass flake-containing cured resin article obtained by curing this polymerizable composition, and artificial marble having natural grain-like pattern containing a ground material of this cured resin article.

BACKGROUND ART

Natural stones have been used for a long period of time as wall materials, floor materials, top boards and the like due to gracefulness thereof. However, natural stones have defects that application and process are difficult because of heavy weight and high hardness, stain removal is difficult because of porous surface, long size articles are not obtained easily leading to articles having seam, and the like.

Therefore, resin molder articles having natural grain-like pattern have been developed such as artificial marble and the like which can be used instead of natural stones. Since resin molded articles having grain-like pattern have grace texture, excellent strength and weather-resistance, easy applicability and processability, and the like, the amount used thereof is increasing year by year mainly in sanitary field.

As the resin molder articles having natural grain-like pattern, there are exemplified melamine-decorated plates, gel-coated artificial marble in which patterning has been conducted only on the surface, acrylic artificial marble, polyester artificial marble and the like. They are light and are not porous, as compared with natural marble. However, the melamine-decorated plate and gel-coated artificial marble have defects that processing and repairing are difficult and impact-resistance is low, because patterning has been conducted only on the surface thereof.

On the other hand, the acrylic artificial marble and polyester artificial marble have grace texture specific to solid materials. In particular, the acrylic artificial marble has a number of merits such as easy processability, excellent strength, impact-resistance and weather-resistance, and the like.

As the acrylic artificial marble and polyester artificial marble having natural grain-like pattern, for example, Japanese Patent Publication (JP-B) No. 61-24357 discloses artificial marble containing transparent/semi-transparent/opaque particles dispersed composed of ground stones such as quartz, malachite, marble, obsidian and the like; or resin ground materials such as ABS resins, epoxy resins, melamine resin, phenol resins and the like.

However, artificial marble containing a particle composed of a hard substance such as quartz and the like tends to have poor processability. Particularly, surface abrasion and cutting often lead to unsuccessful results, and in some cases, a processing machine is broken. Further, a particle composed of an epoxy resin and melamine resin is easily charged, consequently, the resin particle tends to adhere and coagulate on wall surface and the like of an apparatus in producing process, causing problems in production.

For solving such problems, Japanese Patent Application Laid-Open (JP-A) No. 5-279575 for example suggests an organic-inorganic composite transparent particle composed of a resin composition (unsaturated polyester-styrene copolymer, benzyl methacrylate-ethylene glycol dimethacrylate copolymer) and a soft inorganic filler such as aluminum hydroxide and the like. However, this organic-inorganic composite transparent particle has insufficient transparency, and the appearance of artificial marble in which the particles are dispersed is not graceful appearance remarkably resembling a natural stone, and twinkling feeling thereof tends to differ from that of a natural stone.

Therefore, for the purpose of reproducing twinkling feeling resembling that of a natural stone, JP-A Nos. 59-171612, 62-27363 and 6-172001, for example, disclose use of mica as a filler or pattern material for artificial marble. Also, for example, JP-B No. 6-18999 and JP-A No. 3-139548 disclose use of a glass flake as a filler or pattern material for artificial marble. Further, JP-A No. 6-322143, for example, discloses use of an organic-inorganic composite particle composed of a mica flake or glass flake and a crystalline thermoplastic resin as a pattern material for artificial marble.

However, the artificial marble disclosed in JP-A Nos. 59-171612, 62-27363, 6-172001, JP-B No. 6-18999 and JP-A No. 3-139548 has problems that since a mica flake or glass flake is directly compounded in a matrix composed of a polymer and an inorganic filler, the appearance is flat and lacks in depth feeling, and texture is different from that of a natural stone. The organic-inorganic composite particle disclosed in JP-A No. 6-322143 has problems that hardness is high and processability of artificial marble is decreased because a crystalline thermoplastic resin is used in the particle. In particular, when the surface of artificial marble after molding is abraded, it is difficult to finish the surface smoothly because the difference in hardness between the matrix composed of a resin and an inorganic filler and the composite particle is high.

DISCLOSURE OF INVENTION

The object of the present invention is to provide artificial marble further having appearance remarkably resembling a natural stone while maintaining features originally owned by artificial marble, namely, uniform and non-porous solid materials applicability and processability, equivalent to that of hard wood, maintenance easiness, impact-resistance, weather-resistance, flame retardancy and the like, and further, a cured resin article useful as a pattern material of this artificial marble and a polymerizable composition useful as a raw material thereof.

The present inventors have intensively studied for attaining the above-described object, and as a result, found that artificial marble comprising particles dispersed containing a vinyl polymer (A) and a mica flake and/or glass flake has appearance remarkably resembling a natural stone and in addition, has excellent properties such as processability and the like, completing the present invention.

Namely, the present invention relates to an artificial marble in which particles (X) containing a vinyl copolymer (A), and mica flake (B) and/or a glass flake (C) are dispersed in a matrix (Y) containing a vinyl polymer (E).

The present invention further relates to a mica flake- and/or glass flake-containing cured resin article which comprising a vinyl polymer (A), mica flake (B) and/or a glass flake (C), and an inorganic filler (D), and wherein a difference between the refractive index of the vinyl polymer (A) at room temperature and the refractive index of the inorganic filler (D) at room temperature is in the range from −0.02 to +0.02.

Furthermore, the present invention relates to a mica flake- and/or glass flake-containing polymerizable composition comprising a resin component containing a radical-polymerizable vinyl compound (a) and a polymer powder in which the bulk density is in the range from 0.1 to 0.9 g/ml and the oil absorption for linseed oil is in the range from 10 to 200 ml/100 g, and mica flake (B) and/or a glass flake (C); a mica flake- and/or glass flake-containing cured resin article obtained by curing this polymerizable composition; and an artificial marble containing a ground material of this cured resin article.

The artificial marble of the present invention contains a dispersed particles (X) having twinkling feeling, and the artificial marble has appearance revealing depth feeling and significant gracefulness resembling that of a natural stone, and in addition, maintains features originally owned by acrylic artificial marble such as applicability, processability and the like (including other features such as stain resistance, high strength, easy maintenance and the like). Therefore, the artificial marble of the present invention is very useful for top plates of counters and kitchen furniture, floor boards, and the like for which applicability and processability are particularly required.

BEST MODE FOR CARRYING OUT THE INVENTION

The vinyl polymer (A) constituting the particles (X) used in the present invention is usually obtained by polymerizing a radical-polymerizable vinyl compound (a).

The radical-polymerizable vinyl compound (a) may be advantageously selected appropriately if required, and is not particularly restricted in the present invention. Specific examples thereof include (meth)acrylates carrying an alkyl group having 1 to 20 carbon atoms; unsaturated carboxylic acids such as (meth)acrylic acid and the like; acid anhydrides such as maleic anhydride, itaconic anhydride and the like; maleimide derivatives such as N-phenylmaleimide, N-cyclohexylmaleimide and the like; hydroxyl group-containing monomers such as 2-hydroxyethyl (meth)acrylate, 2-hydroxypropyl (meth)acrylate and the like; vinyl esters such as vinyl acetate, vinyl benzoate and the like; vinyl chloride, vinylidene chloride and derivatives thereof; nitrogen-containing monomers such as (meth)acrylamide, acrylonitrile and the like; epoxy group-containing monomers such as glycidyl (meth)acrylate and the like; aromatic vinyl compounds containing an ethylenically unsaturated bond in the molecule such as styrene, α-methylstyrene, p-methylstyrene, benzyl (meth)acrylate, phenyl (meth)acrylate, phenethyl (meth)acrylate and the like; polyfunctional (meth)acrylates such as ethylene glycol di(meth)acrylate, propylene glycol di(meth)acrylate, 1,3-butylene glycol di(meth)acrylate, 1,4-butylene glycol di(meth)acrylate, 1,6-hexane diol di(meth)acrylate, dimethylolethane di(meth)acrylte, 1,1-dimethylolpropane di(meth)acrylate, 2,2-dimethylolpropane di(meth)acrylate, trimethylolethane tri(meth)acrylate, trimethylolpropane tri(meth)acrylate, tetramethylolmethane di(meth)acrylate, 2,2-bis(4-(meth)acryloxypolyethoxyphenyl)propane, allyl(meth)acrylate and the like; compounds having two or more ethylenically unsaturated bonds in the molecule such as divinylbenzene, butadiene and the like; unsaturated polyester prepolymers derived from at least one of polyfunctional carboxylic acids including an ethylenically unsaturated polycarboxylic acid and from at least one of diols; vinylester prepolymers derived by acrylic-modification of the end of an epoxy group; as well as other compounds.

These may be used alone or in combination of two or more. Further, those obtained by previously partially polymerizing a part of a monomer can also be used, if necessary.

Use of a polymer other than the vinyl polymer (A), namely a polymer other than polymers of the radical-polymerizable vinyl compound (a), for example, a crystalline thermoplastic polymer such as a polyamide, polyalkylene terephthalate or the like as the polymer component constituting the particles (X) is not preferable because then the difference in hardness between the particle (X) and the matrix (Y) is large, consequently unevenness tends to occur in abrading the surface of artificial marble after molding, and processability becomes inferior.

The content of the vinyl polymer (A) in the particle (X) may be appropriately selected depending on properties intended, and is preferably within the range from 20 to 99.95% by weight based on the total weight of the particle (X). When this content is 20% by weight or more, molding property and strength of a mica flake- and/or glass flake-containing cured resin article which is a raw material of the particle (X) tends to be superior. On the other hand, when this content is 99.95% by weight or less, charge preventing property and hardness of a mica flake- and/or glass flake-containing cured resin article tends to be superior. This content is more preferably within the range from 40 to 99.9% by weight.

In the particle (X), either at least one mica flake (B) or at least one glass flake (C) or both of them are contained together with this vinyl polymer (A) for the purpose of allowing artificial marble to manifest twinkling feeling resembling that of a natural stone.

The mica flake (B) to be contained in the particle (X) is not particularly restricted, and a variety of mica conventionally known can be used whether they are natural materials or synthetic articles. Further, if necessary, mica coated with various metal compounds can also be used. As specific examples of the metal compound, titanium oxide, silver, nickel and the like are listed. Mica flake coated with metal compounds perform action to strengthen twinkling feeling of artificial marble. Therefore, when particles (X) containing this is added as a pattern material for artificial marble, there is preferably a tendency that artificial marble can be endowed with twinkling feeling resembling that of a natural stone by addition thereof in small amount.

The average particle size of the mica flake (B) is preferably from 0.1 to 50 mm. If this average size is 0.1 mm or more, when the particle (X) is used as a pattern material of artificial marble, artificial marble tends to be endowed with twinkling feeling resembling that of natural stone. On the other hand, if this average size is 50 mm or less, molding property of a mica flake- and/or glass flake-containing cured resin article which is a raw material of the particle (X) tends to be superior, and further, stain resistance of artificial marble tends to be excellent. This average size is more preferably within the range from 0.1 to 10 mm, and particularly preferably within the range from 0.2 to 7 mm.

The glass flake (C) contained in the particle (X) is not particularly restricted, and various glass flake conventionally known can be used. Further, due to the same reason as for the mica flake (B), glass flake coated with various metal compounds can also be used, if necessary. Regarding specific examples of the metal compound, those exemplified above can be listed.

The average particle size of the glass flake (C) is preferably from 0.1 to 50 mm. If this average size is 0.1 mm or more, when the particle (X) is used as a pattern material of artificial marble, artificial marble tends to be endowed with twinkling feeling resembling that of natural stone. On the other hand, if this average size is 50 mm or less, molding property of a mica flake- and/or glass flake-containing cured resin article which is a raw material of the particle (X) tends to be superior. This average size is more preferably within the range from 0.1 to 10 mm, and particularly preferably within the range from 0.2 to 7 mm.

Also, if necessary, the surface of the mica flake (B) and glass flake (C) can be treated with a silane-based coupling agent, titanate-based coupling agent, aluminum-based coupling agent, stearic acid and phosphoric acid-based surface treatment agent, and the like, and used. These treatment agents may be used alone or in combination of two or more.

The total amount of the mica flake (B) and the glass flake (C) in the particle (X) may advantageously be selected appropriately depending on properties intended. Usually, the total amount is preferably within the range from 0.05 to 80% by weight based on the whole weight of the particle (X). If this content is 0.05% by weight or more, artificial marble tends to be endowed with twinkling feeling resembling that of natural stone when particles (X) is used as a pattern material of artificial marble. On the other hand, if this content is 80% by weight or less, molding property of a cured resin article which is a raw material of the particle (X) tends to be superior. This content is more preferably within the range from 0.1 to 60% by weight.

In the particle (X), an inorganic filler (D) can be contained, if necessary. By inclusion of an inorganic filler (D), charge preventing property and flame retardancy of the particle (X) can be improved. By this improvement of charge preventing property, generation of charge in processes for grinding a cured resin article and transporting the ground material is suppressed, and adhesion and coagulation of the particle (X) on the wall surface and the like of the apparatus become difficult.

The inorganic filler (D) is not particularly restricted providing it is insoluble in a radical-polymerizable vinyl compound (a) and does not disturb its polymerization curing. Specific examples thereof include aluminum hydroxide, magnesium hydroxide, calcium hydroxide, zirconium hydroxide, aluminum, calcium carbonate, magnesium oxide, titanium oxide, barium sulfate, silica, quartz, talc, clay, diatomaceous earth, gypsum, powder glass, montmorillonite, bentonite, pyrophyllite, kaolin, powder chalk, marble, limestone, asbestos, mullite, aluminum silicate, aluminum stearate, calcium silicate, anhydrite, α-cristobalite, alumina white (general formula $[Al_2SO_4(OH)_4 \cdot XH_2O \cdot 2Al(OH)_3]_n$), ettringite, a fine powder prepared by grinding a calcined body obtained by calcinating a mixture of clay and an inorganic material which can develop color after calcination, and the like.

These may be used alone or in combination of two or more depending on demands. Particularly, use of aluminum hydroxide and magnesium hydroxide is preferable because there is a tendency that a cured resin article which is a raw material of the particle (X) can be endowed with excellent flame retardancy and design. Among them, aluminum hydroxide is particularly preferable.

Also, if necessary, the surface of an inorganic filler (D) can be treated with a silane-based coupling agent, titanate-based coupling agent, aluminum-based coupling agent, stearic acid and phosphoric acid-based surface treatment agent, and the like, and used. These treatment agents may be used alone or in combination of two or more.

The average particle size of an inorganic filler (D) is preferably within the range usually from 0.001 to 200 μm. In this range, molding property of a cured resin article which is a raw material of the particle (X) tends to be excellent. This average particle size is more preferably within the range from 1 to 100 μm, and particularly preferably within the range from 1 to 80 μm.

The content of the inorganic filler (D) in the particle (X) may advantageously be selected appropriately depending on properties intended. Usually, it is preferably 80% by weight or less based on the total weight of the particle (X). When this content is 80% by weight or less, transparency, strength and the like of the particle (X) tend to be excellent. This content is more preferably within the range from 10 to 70% by weight, and particularly preferably within the range from 20 to 70% by weight. When the particle (X) contains an inorganic filler (D), the amount of the vinyl polymer (A) is preferably from 10 to 80% by weight, and the amount of the mica (B) and/or glass flake (C) is preferably from 0.05 to 30% by weight.

The total content of the mica (B), glass flake (C) and inorganic filler (D) in the particle (X) is preferably within the range from 0.05 to 80% by weight based on the total weight of the particle (X). The weight ratio thereof, namely, inorganic filler (D)/[mica (B)+glass flake (C)] is preferably 2000 or less, and more preferably 1000 or less.

The particle (X) is used as a pattern material for the artificial marble of the present invention. For imparting to artificial marble appearance more resembling that of a natural stone, it is preferable that the particle (X) has various transparent feelings from opaque to transparent.

Particularly, for obtaining particles (X) containing an inorganic filler (D) and having high transparency, it is preferable the difference between the refractive index of the vinyl polymer (A) constituting the particle (X) at room temperature and the refractive index of the inorganic filler (D) at room temperature is controlled in the range from −0.02 to +0.02.

In this case, it is preferable to use as the radical-polymerizable vinyl compound (a), an aromatic vinyl compound and a (meth)acrylate compound together among the compounds listed above. As the compound to be used together, an aromatic vinyl compound and a polyfunctional (meth)acrylate are more preferable, and styrene and a polyfunctional (meth)acrylate are particularly preferable. If necessary, other radical-polymerizable vinyl compounds can also be used together. When these are used together, the vinyl polymer (A) having refractive index at room temperature within the above-described range tends to be obtained easily, and in addition, there is a tendency that deterioration in appearance of artificial marble due to unclearness of boundary of particles (X) when the particle (X) is dissolved and swollen in producing artificial marble can be prevented.

Further, by using as the polyfunctional (meth)acrylate, a compound having a refractive index of the cured article at room temperature of 1.55 or more such as 2,2-bis(4-meth)acryloyloxypoyethoxyphenyl)propane, it becomes possible to select the composition of a radical-polymerizable vinyl compound (a) freely to a certain extent according to abilities (hardness, strength, solvent-resistance, dimension stability and the like) required for the particle (X) while maintaining the refractive index of the vinyl polymer (A) at room temperature within the above-described range.

When an aromatic vinyl compound and a (meth)acrylate compound are used together as the radical-polymerizable vinyl compound, it is usually preferable that the amount used of the aromatic vinyl compound is within the range from 0.5 to 99.9% by weight and the amount used of the (meth)acrylate compound is within the range from 0.1 to 99.5% by weight based on the whole weight of the vinyl polymer (A).

Since the particle (X) is used as a pattern material for the artificial marble of the present invention, it is preferable to impart to the particle various colors by inclusion of coloring agents such as dyes, pigments and the like.

Further, if necessary, the particle (X) can contain additives such as a flame retardant, reinforcing agent, ultraviolet absorber, heat stabilizer, releasing agent, precipitation inhibitor and the like.

The particle (X) is obtained, for example, by molding under heat and pressure a polymerizable composition containing a radical polymerizable vinyl compound (a) and mica flake (B) and/or glass flake (C), and if necessary, an inorganic filler (D) to obtain a mica flake- and/or glass flake-containing cured resin article, and grinding the cured article. Specific examples of this radical-polymerizable vinyl compound are as explained above.

Also, the vinyl polymer (A) constituting the particle (X) may be a polymer obtained by polymerizing a polymerizable syrup composed of a monomer component including the radical-polymerizable vinyl compound (a) and a polymer component. When a polymerizable syrup containing a polymer component is used, polymerization shrinkage in molding a mica flake- and/or glass flake-containing cured resin article which is a raw material of the particle (X) becomes small, and occurrence of crack can be prevented.

The polymerizable syrup can be obtained, for example, by partially polymerizing a part of a monomer component, or mixing a polymer component into a monomer component. Particularly, for obtaining particles (X) having high transparency, it is preferable to use as the polymer component an aromatic vinyl (co)polymer such as, for example, polystyrene, styrene-(meth)acrylate copolymer, styrene-vinyl acetate copolymer, styrene-butadiene copolymer, polybenzyl (meth)acrylate, benzyl (meth)acrylate-(meth) acrylate copolymer and the like. They may be used alone or in combination of two or more. Among them, polystyrene, styrene-(meth)acrylate copolymer are preferable.

When a polymerizable syrup is used, it is preferable that the amount of a polyfunctional (meth)acrylate is within the range from 0.1 to 80% by weight and the amount of an aromatic vinyl compound is within the range from 99.9 to 20% by weight based on the total weight of monomer components. When the amount of a polyfunctional (meth) acrylate is 0.1% by weight or more, productivity in molding under heat and pressure of a mica flake- and/or glass flake-containing cured resin article tends to be excellent. On the other hand, when the amount is 80% by weight or less, the difference in refractive index between the vinyl polymer (A) and the inorganic filler (D) tends to be easily controlled within the above-described range.

The method (addition order, kneading method and the like) for obtaining a polymerizable composition containing a radical polymerizable vinyl compound (a) and mica flake (B) and/or glass flake (C), and if necessary, an inorganic filler (D) is not particularly restricted. For example, the polymerizable composition can be obtained by adding components, and if necessary, other components, and kneading the resulted mixture uniformly using a known mixing and kneading apparatus such as a high speed stirrer, kneading roll, kneader and the like.

Also, the method for producing the particle (X) is not particularly restricted. For example, the particle can be obtained by molding a polymerizable composition using a casting molding method, pressure molding method, extrusion molding method, transfer molding method and the like, then, grinding the cured resin article.

When this mica flake- and/or glass flake-containing polymerizable composition is molded and cured by heating under pressure, it is preferable to add a suitable thickener for thickening the composition to make handling thereof excellent. For example, a thickening method such as an ion cross-linking reaction using magnesium oxide or the like can be utilized. Particularly, addition of a polymer powder having a bulk density in the range from 0.1 to 0.9 g/ml and an oil absorption for linseed oil in the range from 10 to 200 ml/100 g is preferable because handling property thereof tends to be improved significantly.

When this bulk density is 0.1 g/ml or more, a polymer powder is not scattered easily, yield in production thereof is excellent, dusting in adding a polymer powder into the polymerizable composition and mixing them decreases, leading to excellent workability. On the other hand, when the bulk density is 0.9 g/ml or less, sufficient thickening effect can be obtained by use of a polymer powder in small amount, and thickening is accomplished in a short period of time, therefore, productivity increases leading also to advantage in cost. This bulk density is further preferably within the range from 0.1 to 0.7 g/ml, and particularly preferably within the range from 0.15 to 0.55 g/ml.

Furthermore, when the oil absorption for linseed oil is 10 ml/100 g or more, sufficient thickening effect can be obtained by use of a polymer powder in small amount, and thickening is accomplished in a short period of time, therefore, productivity increases leading also to advantage in cost. On the other hand, when the oil absorption for linseed oil is 200 ml/100 g or less, dispersibility of a polymer powder in the polymerizable composition becomes excellent. This oil absorption is further preferably within the range from 30 to 180 ml/100 g, and particularly preferably within the range from 70 to 130 ml/100 g.

The average particle size of a polymer powder is not particularly restricted, and preferably within the range from 1 to 250 $\mu$m. When the average particle size is 1 $\mu$m or more, dusting of a powder tends to decrease and handling property of a polymer powder tends to be excellent. On the other hand, when it is 250 Jim or less, appearance of a cured resin article, particularly, gloss and surface smoothness thereof tend to be excellent. This average particle size is more preferably within the range from 3 to 150 $\mu$m, particularly preferably within the range from 10 to 100 $\mu$m.

The polymer constituting a polymer powder is not particularly restricted, and various polymers can be selected appropriately depending on demands. Specific examples of the constituent components (monomers and the like) of this polymer include (meth)acrylates carrying an alkyl group having 1 to 20 carbon atoms; unsaturated carboxylic acids such as (meth)acrylic acid and the like; acid anhydrides such as maleic anhydride, itaconic anhydride and the like; maleimide derivatives such as N-phenylmaleimide, N-cyclohexylmaleimide and the like; hydroxyl group-containing monomers such as 2-hydroxyethyl (meth) acrylate, 2-hydroxypropyl (meth)acrylate and the like; vinyl esters such as vinyl acetate, vinyl benzoate and the like; vinyl chloride, vinylidene chloride and derivatives thereof; nitrogen-containing monomers such as (meth)acrylamide, acrylonitrile and the like; epoxy group-containing monomers such as glycidyl (meth)acrylate and the like; aromatic vinyl compounds containing an ethylenically unsaturated bond in the molecule such as styrene, $\alpha$-methylstyrene, p-methylstyrene, benzyl (meth)acrylate, phenyl (meth) acrylate, phenethyl (meth)acrylate and the like; unsaturated polyester pre-polymers derived from at least one of polyfunctional carboxylic acids including an ethylenically unsaturated polycarboxylic acid and from at least one of diols; vinylester prepolymers derived by acrylic-modification of the end of an epoxy group; as well as other compounds.

When a cross-linked polymer is used, there may be used advantageously, as the constituent components of the polymer, for example, polyfunctional (meth)acrylates such as ethylene glycol di(meth)acrylate, propylene glycol di(meth)acrylate, 1,3-butylene glycol di(meth)acrylate, 1,4-butylene glycol di(meth)acrylate, 1,6-hexane diol di(meth) acrylate, dimethylolethane di(meth)acrylate, 1,1-dimethylolpropane di(meth)acrylate, 2,2-dimethylolpropane di(meth)acrylate, trimethylolethane tri(meth)acrylate, trimethylolpropane tri(meth)acrylate, tetramethylolmethane di(meth)acrylate, 2,2-bis(4-(meth) acryloxypolyethoxyphenyl)propane, allyl(meth)acrylate and the like; compounds having two or more ethylenically unsaturated bonds in the molecule such as divinylbenzene, butadiene and the like; as well as other compounds.

These various constituent components may be used alone or in combination of two or more.

The production method of a polymer powder is not particularly restricted, and the polymer powder can be obtained by a method such as, for example, bulk polymerization, solution polymerization, suspension polymerization, emulsion polymerization, dispersion polymerization and the like. Among them, a method for obtaining a polymer powder by conducting treatment such as spray drying, freeze dry, salt/acid precipitation and the like on an emulsion obtained by emulsion polymerization is superior in production efficiency and preferable.

The ratio of the radical-polymerizable vinyl compound (a) in the vinyl polymer (A) to a polymer powder as a thickener may advantageously be selected appropriately. Usually, it is preferable that the amount of a polymer powder is within the range from 0.1 to 50 parts by weight based on 100 parts by weight of the radical-polymerizable vinyl compound (a). When the amount of a polymer powder is 0.1 part by weight or more, the effect of the polymer powder as a thickener becomes sufficient. On the other hand, when it is 50 parts by weight or less, dispersibility of a polymer powder in a mica flake- and/or glass flake-containing cured resin article tends to be excellent. The amount of a polymer powder is more preferably within the range from 1 to 40 parts by weight.

The method for polymerizing and curing a polymerizable composition is not particularly restricted. The polymerization and curing can be conducted by any method such as, for example, a method in which the composition is heated in the presence or absence of a radical polymerization initiator, a method using redox system comprising a radical polymerization initiator and an accelerator, as well as other methods.

Specific examples of the initiator include azo compounds such as 2,2'-azobis(isobutyronitrile), 2,2'-azobis(2,4-dimethylvaleronitrile) and the like, organic peroxides such as benzoyl peroxide, lauroyl peroxide and the like, and polymerization initiators of these redox systems. They may be used alone or in combination of two or more.

When the polymerization initiator is an organic peroxide, a tertiary amine can also be used as a polymerization accelerator. Further, there can also be used systems obtained by combining water, a mercaptane compound such as ethylene glycol dimercapto acetate and the like, a sulfur active agent which is an oxo acid salt of sulfur or free salt thereof, and the like, with hemi-peresters of maleic acid obtained by reacting a basic metal compound and a saturated tertiary alkyl peroxymaleic acid such as t-butyl peroxymaleic acid and the like. These polymerization initiator systems can be appropriately selected depending on desired polymerizing and curing conditions (temperature, time, cost and the like).

As the method for casting-molding a mica flake- and/or glass flake-containing cured resin article, there are exemplified a method in which a polymerizable composition is cast in between two opposing inorganic glass plates or metal plates of which peripheral portions are sealed with a gasket and the composition is heated (cell casting method), a method in which a polymerizable composition is continuously cast from upstream of a space sealed with two metal endless belts and a gasket or a space sealed with one metal endless belt and one resin film and a gasket each progressing at the same speed to the same direction and is heated (continuous casting method), as well as other methods. In this procedure, it is also possible that the surface of the inorganic glass plate and metal plate is covered with a resin film such as polyvinyl alcohol, polyester and the like and molding is conducted, in view of releasing property, design and the like.

As the method for molding under heat and pressure a mica flake and/or glass flake-containing cured resin article, there is, for example, a method in which a polymerizable composition is filled in a mold, and the composition is cured by heating and pressuring at a temperature usually from 60 to 180° C., preferably from 80 to 150° C. and a pressure of usually from 10 to 500 kg/cm$^2$, preferably from 20 to 250 kg/cm$^2$.

The mica flake- and/or glass flake-containing cured resin article obtained by the above-described method has twinkling feeling resembling that of a natural stone. The particle (X) is obtained by grinding this cured resin article. When this particle (X) is used as a pattern material of artificial marble, extremely graceful appearance of artificial marble remarkably resembling that of a natural stone can be obtained, and stain-resistance, strength and the like thereof are also excellent.

A cured resin article is ground so that particles (X) having desired size is obtained. Larger the size of a ground material, appearance more resembling that of a natural stone is imparted to artificial marble. However, when the surface of artificial marble containing particles (X) dispersed is shaved to depth about half of the particle size of the particle (X), the particle (X) emerges on the surface of the artificial marble obtaining appearance more resembling that of a natural stone, therefore, smaller the size of the particle (X), smaller extent of the surface shaving is required. Because of these points, the size of the particle (X) is preferably from about 0.2 to 10 mm.

As means for grinding a cured resin article, there are exemplified a ball mill, rod mill, column type mill, vibration mill, break crusher, hammer mill, jet mill, flow grinder and the like. Particles (X) obtained by grinding by these means is angular, and imparts natural-like appearance to artificial marble.

The content of particles (X) in artificial marble may be advantageously selected according to properties (particularly, surface appearance) of artificial marble intended. Usually, particles (X) is used an amount within the range preferably from 0.5 to 90% by weight, more preferably from 2 to 80% by weight based on the total weight of artificial marble. When the content is 0.5% by weight or more, design of a natural grain-like pattern becomes excellent. On the other hand, when the content is 90% by weight or less, design of a natural grain-like pattern tends to become excellent and properties such as strength and the like tend to become excellent.

In some cases, the particle (X) is required to have conceited transparency. In this case, it is preferable that the whole light transmittance of a composition excepting the mica flake (B) and the glass flake (C) in the particle (X) (namely, a composition consisting of the vinyl polymer (A) and the inorganic filler (D)) is 70% or more (measured in a sheet of 0.3 mm thickness according to ASTM D1003). More preferably, the whole light transmittance is 80% or more. When the whole light transmittance is 70% or more, there is a tendency that the transparency of the particle (X) become sufficient and appearance resembling that of a natural stone can be imparted to artificial marble.

Further, particles (X) having low electrostatic charge is preferable. Specifically, it is preferable that the surface resistance value measured according to JIS K6911 is $1.0 \times 10^{15} \Omega$ or less. When this surface resistance is $1.0 \times 10^{15} \Omega$ or less, there is a tendency that the particle (X) does not easily adhere and coagulate on the wall surface and the like of an apparatus along with poor generation of static electricity in processes of transporting and grinding the particle (X).

In the artificial marble of the present invention, particles (X) are dispersed in a matrix (Y) containing a vinyl polymer (E). By this constitution, twinkling feeling resembling that of natural stone can be imparted to artificial marble without losing original features of artificial marble.

The vinyl polymer (E) is preferably a polymer obtained by polymerizing a polymerizable syrup (e) composed of a monomer component and a polymer component. As the monomer component and the polymer component of the polymerizable syrup (e), for example, the components of the radical-polymerizable vinyl compound (a) and polymerizable syrup thereof as explained above can be appropriately selected and used. Also, two or more monomer components which are compatible and can be copolymerized can be mixed for use. Among them, (meth)acrylates are preferable, and methyl methacrylate is particularly preferable.

Regarding the monomer components of the polymerizable syrup (e), it is preferable that one or more (meth)acrylates occupy 50% by weight or more of the total amount, and more preferably 70% by weight or more. Further, a part of the monomer components can be previously partially polymerized for use. Also, a polyfunctional (meth)acrylate can be used as a cross-linking agent, if necessary.

The matrix (Y) constituting the artificial marble of the present invention contains a vinyl polymer (E), and further, can contain an inorganic filler (F), if necessary. By inclusion of an inorganic filler (F), hardness and flame retardancy of the artificial marble can be improved.

The inorganic filler (F) can be appropriately selected from, for example, the inorganic fillers (D) as described above, to be used. Among them, aluminum hydroxide is preferable.

The average particle size of the inorganic filler (F) is preferably within the range from 1 to 200 μm. When this average particle size is 1 μm or more, there is a tendency that molding property becomes excellent and design of the resultant molded article becomes specific to artificial marble. On the other hand, when the average diameter is 200 μm or less, the inorganic filler (F) tends to be dispersed uniformly. This average particle size is more preferably within the range from 1 to 100 μm, particularly preferably from 1 to 80 μm.

The content of the inorganic filler (F) may be advantageously selected appropriately according to abilities required of the resultant artificial marble. Usually, the content is preferably 85% by weight or less based on the total weight of the matrix (Y). When this is 85% by weight or less, design, strength and the like of the artificial marble tend to be excellent. More preferably, it is more preferably within the range from 5 to 75% by weight.

It is preferable that the transparency of the matrix (Y) differs from that of the particle (X) to an extent to impart conceited contrast when the particles (X) are dispersed. Specifically, it is preferable that when the whole light transmittance of the matrix (Y) is measured in a sheet of 0.3 mm thickness according to ASTM D1003, the whole light transmittance of the matrix (Y) differs from the value of the particle (X) by 1% or more. In this case, there is a tendency that contrast between the matrix (Y) and the particle (X) increases and appearance of artificial marble becomes resembling that of a natural stone.

The artificial marble of the present invention is produced by, for example, molding and curing a mixture comprising a polymerizable syrup (e), particles (X), and if necessary, an inorganic filler (F).

Further, additives such as a flame retardant, coloring agent, reinforcing material, ultraviolet absorber, heat stabilizer, releasing agent, pigment, precipitation inhibitor and the like can be compounded in the mixture within the range not losing the effect of the present invention.

The method for obtaining a mixture for artificial marble containing the particle (X) (addition order, kneading method and the like) is not particularly restricted, and there is a method in which components and if necessary, other components are added and the resulted mixture is kneaded uniformly using a known mixing and kneading apparatus such as a high speed stirrer, kneading roll, kneader and the like, as in the case for producing the particle (X).

The method for polymerizing and curing this mixture for artificial marble is not particularly restricted. For example, there can be listed the same polymerizing and curing methods as in the case for producing the particle (X) as described above.

Also, the method for molding artificial marble is not particularly restricted. For example, various molding methods such as a casting molding method, pressure molding method, extrusion molding method, transfer molding method and the like can be applied as in the case for producing a mica flake- and/or glass flake-containing cured resin article as described above, and after molding using these methods, artificial marble can be obtained by polymerizing and curing the molded article.

Here, when a pressure molding method, injection molding method and transfer molding method are applied, the molding temperature can be selected within the range from 70 to 180° C., preferably from 80 to 150° C., the molding pressure can be selected within the range from 20 to 500 kg/cm$^2$, preferably from 20 to 250 kg/cm$^2$, and the molding time can be selected within the range from 1 to 30 minutes, preferably from 2 to 20 minutes depending on mold form of an article to be molded and physical properties of a composition for artificial marble to be used. Since volume reduction occurs easily accompanying polymerization, the mold to be used preferably has a structure in which the volume of cavity can be reduced along thickness direction accompanying volume reduction.

In artificial marble containing particles (X) dispersed, the size of the particle (X) emerging on the surface increases by shaving the surface thereof, and consequently, appearance more resembling that of the natural stone is imparted. Therefore, it is preferable to shave the surface to depth which is half or more of a particle size of the largest particle (X).

Moreover, it is preferable to increase gloss of the surface of artificial marble because contrast between the particle (X) and the matrix (Y) increases, presence feeling of the particle (X) increases and accordingly, design can be further enhanced.

The following examples further illustrate the present invention, but do not limit the scope thereof. In the following examples, "parts" indicates parts by weight unless otherwise stated. Evaluation methods are as follows.

Appearance: It was evaluated visually.
⊚: extremely graceful appearance having twinkling feeling resembling remarkably that of a natural stone
○: graceful appearance having twinkling feeling resembling that of a natural stone
Δ: appearance which has twinkling feeling, however, which is flat and lacking in depth feeling and which has different aesthetic feeling from that of a natural stone
×: appearance in which uniform particles are dispersed, which has no twinkling feeling and has no difference from conventional artificial marble Whole light transmittance: It was measured using a sheet having a thickness of 0.3 mm according to ASTM D1003 using a haze meter (HGM-2DP, manufactured by Suga Shikenki K.K.).

Surface resistance: It was measured according to JIS K6911 using ULTRA MEGOHMMETER (SM-10E, manufactured by Toa Dempa Kogyo K.K.).

Stain-resistance: The surface was stained with three kinds of stains (rouge, shoe blacking, hair dye), then, left for 24 hours at 23° C., then, washed sequentially by the following methods, and stain-resistance was evaluated based on points of washing methods when stains were removed completely.

| | |
|---|---|
| 1) Washing with water | 1 point |
| 2) Washing with neutral detergent | 2 points |
| 3) Washing with cleanser | 3 points |
| 4) Abrading with sand paper | 4 points |

Bending test: It was measured according to JIS K7203.
Physical properties of polymer powder
Average particle size: It was measured using a laser scattering particle size distribution analyzer (LA-700, manufactured by Horiba Seisakusho).
Bulk density: It was measured according to JIS R 6126-1970.
Oil absorption: It was measured according to JIS K 5101-1978.
Weight-average molecular weight: Measured value according to GPC method (polystyrene standard)
Swelling degree: A polymer powder was charged into a 100 ml measuring cylinder, compressed to 5 ml by tapping several times, then, styrene cooled to 10° C. or lower was added so that the total amount was 100 ml, stirred quickly so that whole mixture became uniform, then, the measuring cylinder was kept for 1 hour in a thermostat chamber at 25° C., the volume of the polymer powder layer after swelling was measured, and the swelling degree was represented by the ratio thereof to the volume before swelling (5 ml).

EXAMPLE 1

Production of particle (X-1)

In a mixed monomer solution composed of 75 parts of styrene, 20 parts of a polystyrene syrup (hereinafter, abbreviated as ST-SP) previously polymerized to a polymerization ratio of 20% by weight and 5 parts of ethylene glycol dimethacrylate (hereinafter, abbreviated as EDMA) was dissolved 1 part of 2,2'-azobis(2,4-dimethyl valeronitrile) (hereinafter, abbreviated as AVN). The refractive index at room temperature of a cured article of this mixed syrup was 1.59.

Then, to 40 parts of this mixed syrup was added 57 parts of aluminum hydroxide (hereinafter, abbreviated as ATH) (trade name: BW103, refractive index: 1.57, manufactured by Nippon Light Metal CO., Ltd.), 3 parts of a mica flake (trade name: C-113, manufactured by Yamaguchi Unmo Kogyosho K.K.) (hereinafter, abbreviated as MICA) and 0.5 parts of an amorphous silica fine particle (trade name: Aerosil 300, manufactured by Nippon Aerosil K.K.) (hereinafter, abbreviated as A300) as a precipitation inhibitor, and the mixture was stirred by a stirrer to prepare a casting raw material. This casting raw material contains 57% by weight of ATH and 3% by weight of MICA compounded.

This casting raw material was subjected to pressure reduction to remove dissolved air, then, this was poured into a cell made by a gasket and two stainless steel plates (covered with a polyester film) of which thickness had been previously controlled to 3 mm. Then, polymerization was conducted at 80° C. for 4 hours and at 120° C. for 2 hours to obtain a mica flake-containing cured resin article having excellent transparency and twinkling feeling.

The surface resistance of this cured resin article was $1.3 \times 10^{12} \Omega$.

For measuring the whole light transmittance of a composition excepting MICA of this cured resin article, a cured resin article having a thickness of 0.3 mm was produced in the same manner as described above except that no MICA was added, and the whole light transmittance thereof was measured to find it was 87%.

This cured resin article was ground by a grinder, then, classified by a sieve to produced a particle (X-1) having a particle size of 5 to 0.2 mm. In this procedure, the particle (X-1) did not adhere to the surface of the grinder and the sieve, and there was no phenomenon revealing static electricity charged on the particle (X-1). The composition and physical properties of the particle (X-1) are shown in Table 1.

EXAMPLE 2

Production of Particle (X-2)

In a mixed monomer solution composed of 79 parts of styrene, 20 parts of ST-SP and 1 part of EDMA was dissolved 1 part of AVN. The refractive index at room temperature of a cured article of this mixed syrup was 1.59.

Then, to 40 parts of this mixed syrup was added 57 parts of ATH, 3 parts of a metal-coated mica flake (trade name: ALTIMICA SH-100, coated with titanium oxide, manufactured by Nippon Koken Kogyo K.K.) (hereinafter, abbreviated as M-MICA) and 0.5 parts of A300, and the mixture was stirred by a stirrer to prepare a casting raw material. This casting raw material contains 57% by weight of ATH and 3% by weight of M-MICA compounded.

Using this casting raw material prepared, a metal-coated mica flake-containing cured resin article having transparency and twinkling feeling was obtained in the same manner as in Example 1.

Then, a particle (X-2) having a particle size of 5 to 0.2 mm was produced in the same manner as in Example 1. In this procedure, the particle (X-2) did not adhere to the surface of the grinder and the sieve, and there was no phenomenon revealing static electricity charged on the particle (X-2). The composition and physical properties of the particle (X-2) are shown in Table 1.

EXAMPLE 3

Production of Particle (X-3)

A glass flake-containing cured resin article having transparency and twinkling feeling was obtained in the same manner as in Example 1 except that a glass flake (trade name: REF-600, manufactured by Nippon Sheet Glass Co., Ltd.) (hereinafter, abbreviated as G-F) was used instead of MICA.

Then, a particle (X-3) having a particle size of 5 to 0.2 mm was produced in the same manner as in Example 1. In this procedure, the particle (X-3) did not adhere to the surface of the grinder and the sieve, and there was no phenomenon revealing static electricity charged on the particle (X-3). The composition and physical properties of the particle (X-3) are shown in Table 1.

EXAMPLE 4

Production of Particle (X-4)

A metal-coated glass flake-containing cured resin article having transparency and twinkling feeling was obtained in the same manner as in Example 1 except that a metal-coated glass flake (trade name: METASHINE RCFSX-5600TS, coated with titanium oxide, manufactured by Nippon Sheet Glass Co., Ltd.) (hereinafter, abbreviated as M-G-F) was used instead of MICA.

Then, a particle (X-4) having a particle size of 5 to 0.2 mm was produced in the same manner as in Example 1. In this procedure, the particle (X-4) did not adhere to the surface of the grinder and the sieve, and there was no phenomenon revealing static electricity charged on the particle (X-4). The composition and physical properties of the particle (X-4) are shown in Table 1.

EXAMPLE 5

Production of Particle (X-5)

A metal-coated mica flake- and metal-coated glass flake-containing cured resin article having transparency and twinkling feeling was obtained in the same manner as in Example 1 except that 57 parts of ATH, 1.5 parts M-MICA and 1.5 parts of M-G-F were added to 40 parts of the same syrup as in Example 1.

Then, a particle (X-5) having a particle size of 5 to 0.2 mm was produced in the same manner as in Example 1. In this procedure, the particle (X-5) did not adhere to the surface of the grinder and the sieve, and there was no phenomenon revealing static electricity charged on the particle (X-5). The composition and physical properties of the particle (X-5) are shown in Table 1.

EXAMPLE 6

Production of Particle (X-6)

A metal-coated mica flake-containing black cured resin article having twinkling feeling was obtained in the same manner as in Example 1 except that 2 parts of a toner for acrylic resins (trade name: AT-854, manufactured by Dain-ippon Seika Kogyo K.K.) was added to 100 parts of the same casting raw material as used in Example 2.

Then, a particle (X-6) having a particle size of 5 to 0.2 mm was produced in the same manner as in Example 1. In this procedure, the particle (X-6) did not adhere to the surface of the grinder and the sieve, and there was no phenomenon revealing static electricity charged on the particle (X-6). The composition and physical properties of the particle (X-6) are shown in Table 1.

EXAMPLE 7

Production of Particle (X-7)

In a mixed syrup prepared by pre-polymerizing a mixed monomer solution composed of 94 parts of methyl methacrylate (hereinafter, abbreviated as MMA) and 3 parts of EDMA to a polymerization ratio of 20% by weight was dissolved 1 part of AVN. The refractive index at room temperature of a cured article of this mixed syrup was 1.49. Then, to 97 parts of this mixed syrup was added 3 parts of M-G-F, and the mixture was stirred by a stirrer to prepare a casting raw material. This casting raw material contains 3% by weight of M-G-F compounded.

The prepared casting raw material was molded and cured by polymerization in the same manners as in Example 1 to obtain a cured resin article having excellent transparency and twinkling feeling. The surface resistance of this cured resin article was $9.9 \times 10^{14} \Omega$.

For measuring the whole light transmittance of parts excepting M-G-F of this molded article, a cured resin article having a thickness of 0.3 mm was produced in the same manner as described above except that no M-G-F was added, and the whole light transmittance thereof was measured to find it was 99%.

This cured resin article was ground by a grinder, then, classified by a sieve to produced a transparent particle (X-7) having a particle size of 5 to 0.2 mm. The composition and physical properties of the particle (X-7) are shown in Table 1.

EXAMPLE 8

Production of Particle (X-8)

A metal-coated mica flake-containing cured resin article having semi-transparency and twinkling feeling was obtained in the same manner as in Example 2 except that to 40 parts of a mixed syrup using a mixed monomer solution composed of 97 parts of MMA and 3 parts of EDMA was further added 2 parts of a white pigment (trade name: Stan-Tone White, manufactured by Harwick Chemical Corporation). The refractive index at room temperature of a cured article of this mixed syrup was 1.49. The surface resistance of this cured resin article was $1.6 \times 10^{12} \Omega$, and the whole light transmittance of parts excepting M-MICA of this cured resin article having a thickness of 0.3 mm was 32%.

This cured resin article was ground by a grinder, then, classified by a sieve to produced a semi-transparent particle (X-8) having a particle size of 5 to 0.2 mm. In this procedure, the particle (X-8) did not adhere to the surface of the grinder and the sieve, and there was no phenomenon revealing static electricity charged on the particle (X-8). The composition and physical properties of the particle (X-8) are shown in Table 1.

EXAMPLE 9

Production of Particle (X-9)

Into a separable flask equipped with a condenser, nitrogen inlet port and stirrer was charged 200 parts of deionized water, 1.25 parts of polyoxyethylene alkylphenyl ether phosphate sodium salt (trade name: GAFAC LO-529, manufactured by Toho Kagaku Kogyo K.K.) as an emulsifier, 0.0003 parts of sodium ethylenediaminetetraacetate, 0.4 parts of sodium formaldehydesulfoxylate and 0.0002 parts of ferrous sulfate, and the mixture was heated up to 80° C. while stirring. To this was added a mixed composed of 23 parts of MMA, 77 parts of styrene and 0.1 parts of cumene hydroperoxide dropwise over 3 hours. After completion of the addition, the mixture was kept at 80° C. for 2 hours to obtain an aqueous latex of a MMA-styrene copolymer.

The resulted aqueous latex was subjected to spray drying treatment using a spray drying apparatus (trade name: Type L-8, manufactured by Ookawara Kakoki) to obtain a polymer powder for thickening having an average particle size of 28 μm. The resulted polymer powder had a bulk density of 0.35 g/ml, an oil absorption of 75 ml/100 g, a swelling degree of 20-fold or more, and a weight-average molecular weight of 800000.

Then, to a monomer component composed of 40 parts of styrene and 10 parts of EDMA was added 50 parts of a MMA-styrene copolymer resin (trade name: Estyrene MS-200, manufactured by Nippon Steel Chemical Co., Ltd.) to obtain a viscous polymerizable syrup. Then, into a double arm kneader was charged 30 parts of the polymerizable syrup, 0.4 parts of t-butyl peroxy octate (trade name: Perbutyl O, manufactured by NOF Corp.) and 0.3 parts of zinc stearate as an internal releasing agent and they were mixed, then, 61 parts of ATH and 3 parts of M-G-F were added while stirring. Further, 6 parts of the polymer powder as a thickener was added and the mixture was kneaded for 10 minutes to obtain a highly viscous clay-like metal-coated glass flake-containing polymerizable composition. This metal-coated glass flake-containing polymerizable composition had not stickiness, and handling thereof was excellent. The refractive index at room temperature of a cured article of the mixture of the polymerizable syrup and polymer powder was 1.57.

Then, this polymerizable composition was filled in a 200 mm square flat type mold, and cured with heat and pressure under conditions of a mold temperature of 80° C. and a pressured of 100 kg/cm² for 10 minutes to obtain a metal coated glass flake-containing cured resin article of 3 mm thickness having excellent transparency. The surface resistance of this cured resin article was $1.5 \times 10^{12} \Omega$.

For measuring the whole light transmittance of a composition excepting M-G-F of this cured resin article, a cured resin article having a thickness of 0.3 mm was produced in the same manner as described above except that no M-G-F was added, and the whole light transmittance thereof was measured to find it was 79%.

Then, a particle (X-9) having a particle size of 5 to 0.2 mm was produced in the same manner as in Example 1. In this procedure, the particle (X-9) did not adhere to the surface of the grinder and the sieve, and there was no phenomenon revealing static electricity charged on the particle (X-9). The composition and physical properties of the particle (X-9) are shown in Table 1.

Comparative Example 1

Production of Particle (X-10)

A transparent particle (X-10) having a particle size of 5 to 0.2 mm was produced in the same manner as in Example 1 except that 59 parts of ATH was used instead of 57 parts of ATH and 3 parts of MICA in the cured resin article. In this procedure, the particle (X-10) did not adhere to the surface of the grinder and the sieve, and there was no phenomenon revealing static electricity charged on the particle (X-10). The composition and physical properties of the particle (X-10) are shown in Table 1.

Comparative Example 2

Production of Black Particle (X-11)

In a mixed monomer solution composed of 37 parts of MMA, 60 parts of a MMA syrup which had been prepolymerized to a polymerization ratio of 20% by weight and 3 parts of EDMA was dissolved 3 parts of AVN. The refractive index at room temperature of a cured article of this mixed syrup was 1.49. Then, to 40 parts of this mixed syrup was added 60 parts of ATH and 2 parts of a black toner for acrylic resins, and a black cured resin article was obtained in the same manner as in Example 1.

Then, a particle (X-11) having a particle size of 2 to 0.2 mm was produced in the same manner as in Example 1. In this procedure, the particle (X-11) did not adhere to the surface of the grinder and the sieve, and there was no phenomenon revealing static electricity charged on the particle (X-11). The composition and physical properties of the particle (X-11) are shown in Table 1.

Comparative Example 3

Production of Particle (X-12)

A transparent particle (X-12) was obtained in the same manner as in Example 7 except that M-G-F was not contained in the cured resin article. The composition and physical properties of the particle (X-12) are shown in Table 1.

TABLE 1

| | | | Example | | | | | | | | | | Comparative Example | | |
|---|---|---|---|---|---|---|---|---|---|---|---|---|---|---|---|
| | | | 1 | 2 | 3 | 4 | 5 | 6 | 7 | 8 | 9 | 1 | 2 | 3 |
| | Particle (X) | | X-1 | X-2 | X-3 | X-4 | X-5 | X-6 | X-7 | X-8 | X-9 | X-10 | X-11 | X-12 |
| Compounding composition (parts by weight) | A | Styrene | 30 | 31.6 | 30 | 30 | 30 | 31.6 | — | — | 12 | 31 | — | — |
| | | ST-SP *1 | 8 | 8 | 8 | 8 | 8 | 8 | — | — | — | 8 | — | — |
| | | MMA *2 | — | — | 94 | 39 | — | — | 15 | 97 | | | | |
| | | MMA Syrup *3 | — | — | — | — | — | — | — | — | — | — | 24 | — |
| | | EDMA *4 | 2 | 0.4 | 2 | 2 | 2 | 0.4 | 3 | 1 | 3 | 2 | 1 | 3 |
| | | MS-200 *5 | — | — | — | — | — | — | — | — | 15 | — | — | — |
| | | Polymer powder *6 | — | — | — | — | — | — | — | — | 6 | — | — | — |

TABLE 1-continued

|  |  |  | Example | | | | | | | | | Comparative Example | | |
|---|---|---|---|---|---|---|---|---|---|---|---|---|---|---|
|  |  |  | 1 | 2 | 3 | 4 | 5 | 6 | 7 | 8 | 9 | 1 | 2 | 3 |
|  | Particle (X) |  | X-1 | X-2 | X-3 | X-4 | X-5 | X-6 | X-7 | X-8 | X-9 | X-10 | X-11 | X-12 |
| B | MICA *8 |  | 3 | — | — | — | — | — | — | — | — | — | — | — |
|  | M-MICA *9 |  | — | 3 | — | — | 1.5 | 3 | — | 3 | — | — | — | — |
| C | G-F *10 |  | — | — | 3 | — | — | — | — | — | — | — | — | — |
|  | M-G-F *11 |  | — | — | — | 3 | 1.5 | — | 3 | — | 3 | — | — | — |
| D | ATH *7 |  | 57 | 57 | 57 | 57 | 57 | 57 | — | 57 | 61 | 59 | 60 | — |
| Others | Black toner *12 |  | — | — | — | — | — | 2 | — | — | — | — | 2 | — |
|  | White pigment *13 |  | — | — | — | — | — | — | — | 2 | — | — | — | — |
|  | Silica fine particle *14 | | 0.5 | 0.5 | 0.5 | 0.5 | 0.5 | 0.5 | — | 0.5 | — | 0.5 | — | — |
| Refractive Index | | | 1.59 | 1.59 | 1.59 | 1.59 | 1.59 | 1.59 | 1.49 | 1.49 | 1.57 | 1.59 | 1.49 | 1.49 |
| Whole light transmittance % | | | 87 | 87 | 87 | 87 | 87 | 72 | 99 | 32 | 79 | 87 | 41 | 99 |
| Surface resistance (× $10^{12}\Omega$) | | | 1.3 | 1.0 | 1.3 | 1.0 | 1.0 | 1.0 | 990 | 1.6 | 1.1 | 1.3 | 1.3 | >10000 |
| Particle size (mm) | | | 5~0.2 | 5~0.2 | 5~0.2 | 5~0.2 | 5~0.2 | 5~0.2 | 5~0.2 | 5~0.2 | 5~0.2 | 5~0.2 | 0.2 | 0.2 |

*1 ST-SP: Polystyrene syrup pre-polymerized to a polymerization ratio of 20% by weight
*2 MMA: Methyl methacrylate
*3 MMA syrup: MMA syrup pre-polymerized to a polymerization ratio of 20% by weight
*4 EDMA: Ethylene glycol dimethacrylate
*5 MS-200: MMA-styrene copolymer resin (trade name: Estyrene MS-200, manufactured by Nippon Steel Chemical Co., Ltd.)
*6 Polymer powder: Polymer powder produced in Example 9
*7 ATH: Aluminum hydroxide (trade name: BW103, manufactured by Nippon Light Metal Co., Ltd.)
*8 MICA: Mica flake (trade name: C-113, manufactured by Yamaguchi Unmo Kogyosho K.K.)
*9 M-MICA: Metal-coated mica flake (trade name: ALTTMICA SH-100, coated with titanium oxide, manufactured by Nippon Koken Kogyo K.K.)
*10 G-F: Glass flake (trade name: REF-600, manufactured by Nippon Sheet Glass Co., Ltd.)
*11 M-G-F: Metal-coated glass flake (trade name: RCFSX-5600TS, coated with titanium oxide, manufactured by Nippon Sheet Glass Co., Ltd.)
*12 Black toner: Black toner for acrylic resins (trade name: AT-854, manufactured by Dainippon Seika Kogyo K.K.)
*13 White pigment: Trade name: Stan-Tone White, manufactured by Harwick Chemical Corporation
*14 Silica fine particle: Amorphous silica fine particle (trada name: Aerosil 300, manufactured by Nippon Aerosil K.K.)

EXAMPLE 10

Into 17 parts of MMA was dissolved 15 parts of a MMA syrup pre-polymerized to a polymerization ratio of 20% by weight, 0.15 parts of EDMA and 0.1 part of AVN, then, to this was added 47 parts of ATH (trade name: BW53, manufactured by Nippon Light Metal CO., Ltd.), 0.9 parts of a white pigment (trade name: Stan-Tone White, manufactured by Harwick Chemical Corporation), 18 parts of the transparent particle (X-1) obtained in Example 1, and 3 parts of the black particle (X-11) obtained in Comparative Example 2, and the mixture was stirred by a stirred to prepare a casting raw material.

The prepared casting raw material was molded and cured by polymerization in the same manners as in Example 1 to obtain artificial marble in which particles were dispersed along the surface and depth directions of the sheet. This artificial marble had appearance more resembling that of a natural stone than conventional artificial marble and had extremely excellent design.

For measuring the whole light transmittance of matrix (Y) parts of this artificial marble, artificial marble was produced in the same manner as described above except that the particles (X-1) and (X-l1) were not added, and the whole light transmittance thereof was measured to find it was 42%.

Then, the surface of the artificial marble containing the particles (X-1) and (X-11) was shaved by a planar for wood to a depth of about 0.5 mm, then, the surface was abraded with a 600# sand paper. Before the surface shaving and abrading, particles emerging on the surface of the artificial marble revealed a particle size which was less than half of the actual size and showed blur view, however, after the surface shaving and abrading, transparent particles emerging on the surface of the artificial marble had approximately the same particle size as the actual size and showed clear view, and appearance more resembling that of a natural stone could be obtained.

It was further abraded with a 800# sand paper, then, the surface was polished with a polishing compound. As a result, artificial marble could be obtained having increased contrast between the particles and the matrix and having more excellent design.

EXAMPLES 11 TO 18

A pieces of artificial marble were obtained using compositions shown in Table 2 in the same manner as in Example 10 in which particles were dispersed along the surface and depth directions of the sheet. These artificial marble had appearance more resembling that of a natural stone than conventional artificial marble and had extremely excellent design.

By performing the surface shaving and abrasion and polishing in the same manner as in Example 10, artificial marble could be obtained having increased contrast between the particles and the matrix and having more excellent design.

Comparative Example 4

Artificial marble was obtained in the same manner as in Example 10 except that the transparent particle (X-10) obtained in Comparative Example 1 was used instead of the transparent particle (X-1). The surface thereof carries only uniform transparent particles dispersed without twinkling feeling, and the appearance thereof was almost the same as that of conventional granite-like artificial marble and different from that of a natural stone.

Further, the same surface shaving and abrasion and polishing were performed as in Example 10, however, novel appearance as compared with conventional artificial marble could not be obtained.

Comparative Example 5

Artificial marble was obtained in the same manner as in Example 10 except that the transparent particle (X-12)

obtained in Comparative Example 3 was used instead of the transparent particle (X-1).

However, the surface thereof carries only uniform transparent particles dispersed without twinkling feeling, and the appearance thereof was almost the same as that of conventional granite-like artificial marble and different from that of a natural stone.

Further, the same surface shaving and abrasion and polishing were performed as in Example 10, however, novel appearance as compared with conventional artificial marble could not be obtained.

Comparative Example 6

Artificial marble was obtained in the same manner as in Example 10 except that into 28 parts of MMA was dissolved, 15 parts of a MMA syrup pre-polymerized to a polymerization ratio of 20% by weight, 0.15 parts of EDMA and 0.1 part of AVN, then, to this was added 47 parts of ATH (trade name: BW53, manufactured by Nippon Light Metal CO., Ltd.), 0.9 parts of a white pigment (trade name: Stan-Tone White, manufactured by Harwick Chemical Corporation), 3 parts of the black particle (X-11) obtained in Comparative Example 2 and 7 parts of MICA, as casting raw materials.

Though the appearance thereof had twinkling feeling due to MICA, it was flat and lacks in depth feeling, and was different from that of a natural stone.

Further, the same surface shaving and abrasion and polishing were performed as in Example 10, however, novel appearance as compared with conventional artificial marble could not be obtained.

Comparative Example 7

Artificial marble was obtained in the same manner as in Comparative Example 6 except that M-MICA was used instead of MICA.

Though the appearance thereof had twinkling feeling due to M-MICA, it was. flat and lacks in depth feeling, and was different from that of a natural stone.

Further, the same surface shaving and abrasion and polishing were performed as in Comparative Example 6, however, novel appearance as compared with conventional artificial marble could not be obtained.

Comparative Example 8

Artificial marble was obtained in the same manner as in Comparative Example 6 except that G-F was used instead of MICA.

Though the appearance thereof had twinkling feeling due to G-F, it was flat and lacks in depth feeling, and was different from that of a natural stone.

Further, the same surface shaving and abrasion and polishing were performed as in Comparative Example 6, however, novel appearance as compared with conventional artificial marble could not be obtained.

Comparative Example 9

Artificial marble was obtained in the same manner as in Comparative Example 6 except that M-G-F was used instead of MICA.

Though the appearance thereof had twinkling feeling due to M-G-F, it was flat and lacks in depth feeling, and was different from that of a natural stone.

Further, the same surface shaving and abrasion and polishing were performed as in Comparative Example 6, however, novel appearance as compared with conventional artificial marble could not be obtained.

TABLE 2

| | | Example | | | | | | | | |
|---|---|---|---|---|---|---|---|---|---|---|
| | | 10 | 11 | 12 | 13 | 14 | 15 | 16 | 17 | 18 |
| Y | MMA *15 | 17 | 17 | 17 | 17 | 17 | 17 | 17 | 17 | — |
| | MMA Syrup *16 | 15 | 15 | 15 | 15 | 15 | 15 | 15 | 15 | 20 |
| | EDMA *17 | 0.15 | 0.15 | 0.15 | 0.15 | 0.15 | 0.15 | 0.15 | 0.15 | 0.2 |
| | ATH *18 | 47 | 47 | 47 | 47 | 47 | 47 | 47 | 47 | — |
| X | X-1 | 18 | — | — | — | — | — | — | — | — |
| | X-2 | — | 18 | — | — | — | — | — | — | — |
| | X-3 | — | — | 18 | — | — | — | — | — | — |
| | X-4 | — | — | — | 18 | — | — | — | — | 25 |
| | X-5 | — | — | — | — | 18 | — | — | 12 | — |
| | X-6 | — | — | — | — | — | — | — | 3 | 10 |
| | X-7 | — | — | — | — | — | 18 | — | — | 5 |
| | X-8 | — | — | — | — | — | — | — | 6 | 20 |
| | X-9 | — | — | — | — | — | — | 18 | — | — |
| | X-11 | 3 | 3 | 3 | 3 | 3 | 3 | 3 | — | 20 |
| Other | White pigment *19 | 0.9 | 0.9 | 0.9 | 0.9 | 0.9 | 0.9 | 0.9 | 0.9 | |
| Whole light transmittance of matrix (Y) *23 | | 42 | 42 | 42 | 42 | 42 | 42 | 42 | 42 | 99 |
| Stain-resistance (Total) | | >11 | 9 | 7 | 7 | 8 | 7 | 7 | 9 | |
| Rouge | | 3 | 3 | 2 | 2 | 2 | 2 | 2 | 3 | 3 |
| Shoe blackening | | >4 | 3 | 3 | 3 | 3 | 2 | 3 | 3 | 3 |
| Hair dye | | >4 | 3 | 2 | 2 | 3 | 3 | 2 | 3 | 3 |
| Bending strength (MPa) | | 47 | 50 | 56 | 61 | 55 | 65 | 60 | 50 | 47 |
| Bending modulus (GPa) | | 7.0 | 7.5 | 7.4 | 7.2 | 7.3 | 7.1 | 7.2 | 7.4 | 3.8 |
| Appearance of artificial marble | | ⊚ | ⊚ | ○ | ⊚ | ⊚ | ⊚ | ⊚ | ⊚ | ○ |

TABLE 3

|  |  |  | Comparative Example | | | | | |
|---|---|---|---|---|---|---|---|---|
|  |  |  | 4 | 5 | 6 | 7 | 8 | 9 |
| Compounding composition (parts by weight) | Y | MMA *15 | 17 | 17 | 28 | 28 | 28 | 28 |
|  |  | MMA Syrup *16 | 15 | 15 | 15 | 15 | 15 | 15 |
|  |  | EDMA *17 | 0.15 | 0.15 | 0.15 | 0.15 | 0.15 | 0.15 |
|  |  | ATH *18 | 47 | 47 | 47 | 47 | 47 | 47 |
|  | X | X-10 | 18 | — | — | — | — | — |
|  |  | X-11 | 3 | 3 | 3 | 3 | 3 | 3 |
|  |  | X-12 | — | 18 | — | — | — | — |
|  | B | MICA *20 | — | — | 7 | — | — | — |
|  |  | M-MICA *21 | — | — | — | 7 | — | — |
|  | C | G-F *22 | — | — | — | — | 7 | — |
|  |  | M-G-F *23 | — | — | — | — | — | 7 |
|  | Other | White pigment *19 | 0.9 | 0.9 | 0.9 | 0.9 | 0.9 | 0.9 |
| Whole light transmittance of matrix (Y) *24 |  |  | 42 | 42 | 42 | 42 | 42 | 42 |
| Stain-resistance (Total) |  |  | 7 | 6 | >12 | >10 | >10 | 10 |
| Rouge |  |  | 2 | 2 | >4 | 3 | 3 | 3 |
| Shoe blackening |  |  | 3 | 2 | >4 | 3 | 3 | 3 |
| Hair dye |  |  | 2 | 2 | >4 | >4 | >4 | 4 |
| Bending strength (MPa) |  |  | 64 | 67 | 40 | 53 | 59 | 57 |
| Bending modulus (GPa) |  |  | 7.4 | 7.1 | 8.1 | 8.3 | 8.7 | 8.5 |
| Appearance of artificial marble |  |  | X | X | Δ | Δ | Δ | Δ |

*15 MMA: Methyl methacrylate
*16 MMA syrup: MMA syrup pre-polymerized to a polymerization ratio of 20% by weight
*17 EDMA: Ethylene glycol dimethacrylate
*18 ATH: Aluminum hydroxide (trade name: BW53, manufactured by Nippon Light Metal Co., Ltd.)
*19 White pigment: Trade name: Stan-Tone White, manufactured by Harwick Chemical Corporation
*20 MICA: Mica flake (trade name: C-113, manufactured by Yamaguchi Unmo Kogyosho K.K.)
*21 M-MICA: Metal-coated mica flake (trade name: AL-TIMICA SH-100, coated with titanium oxide, manufactured by Nippon Koken Kogyo K.K.)
*22 G-F: Glass flake (trade name: REF-6001 manufactured by Nippon Sheet Glass Co., Ltd.)
*23 M-G-F: Metal-coated glass flake (trade name: RCFSX-5600TS, coated with titanium oxide, manufactured by Nippon Sheet Glass Co., Ltd.)
*24 Whole light transmittance of matrix (Y): The whole light transmittance of artificial marble produced in the same manner without using particles obtained in Examples 1 to 10 and Comparative Examples 1 to 3 (in the case of Comparative Examples 6 to 9, particle (X-11), MICA, M-MICA, G-F, M-G-F).

What is claimed is:

1. An artificial marble in which mica flake (B) and/or a glass flake (C) are included with a vinyl polymer (A) in particle (X), and particles (X) are dispersed in a matrix (Y) containing a vinyl polymer (E).

2. The artificial marble according to claim 1 wherein the matrix (Y) further contains an inorganic filler (F).

3. The artificial marble according to claim 1 wherein the particle (X) further contains an inorganic filler (D).

4. The artificial marble according to claim 1 wherein the particle (X) contains 20 to 99.95% by weight of the vinyl polymer (A) and 0.05 to 80% by weight of the mica flake (B) and/or the glass flake (C).

5. The artificial marble according to claim 3 wherein the particle (X) contains 10 to 80% by weight of the vinyl polymer (A), 0.05 to 30% by weight of the mica flake (B) and/or the glass flake (C) and 0 to 80% by weight of the inorganic filler (D).

6. The artificial marble according to claim 1 wherein the vinyl polymer (A) is a polymer of a (meth)acrylate with an aromatic vinyl compound.

7. The artificial marble according to claim 1 wherein the vinyl polymer (A) is a polymer obtained polymerizing a polymerizable syrup comprising a monomer component containing a (meth)acrylate and an aromatic vinyl compound, and a polymer component containing an aromatic vinyl polymer.

8. The artificial marble according to claim 3 wherein the particle (X) is a ground material of a mica flake- and/or glass flake-containing cured resin article comprising the vinyl polymer (A), the mica flake (B) and/or the glass flake (C), and the inorganic filler (D), and wherein a difference between the refractive index of the vinyl polymer (A) at room temperature and the refractive index of the inorganic filler (D) at room temperature is in the range from −0.02 to +0.02.

* * * * *